United States Patent [19]

Iida et al.

[11] Patent Number: 4,809,502
[45] Date of Patent: Mar. 7, 1989

[54] POWER EQUIPMENT

[75] Inventors: Giichi Iida; Yoshihiko Tsuboike, both of Tokyo, Japan

[73] Assignee: Kioritz Corporation, Tokyo, Japan

[21] Appl. No.: 180,946

[22] Filed: Apr. 12, 1988

[30] Foreign Application Priority Data

May 15, 1987 [JP] Japan ................................ 62-118378

[51] Int. Cl.$^4$ ............................................. F02B 35/02
[52] U.S. Cl. .......................................... 60/316; 60/319
[58] Field of Search ................................ 60/319, 316

[56] References Cited

U.S. PATENT DOCUMENTS

| | | | |
|---|---|---|---|
| 2,984,967 | 5/1961 | Caddell | 60/316 |
| 4,060,985 | 12/1977 | Fukushima | 60/319 |
| 4,388,804 | 6/1983 | Bushmeyer | 60/319 |
| 4,418,532 | 12/1983 | Momose | 60/316 |

Primary Examiner—Douglas Hart
Attorney, Agent, or Firm—Browdy & Neimark

[57] ABSTRACT

A power equipment includes an exhaust pipe member disposed near a muffler, the exhaust pipe member having an exhaust gas passage portion which communicates with the outlet of the muffler and an outlet passage portion whose downstream end has a downstream outlet end communicating with the atmosphere. The power equipment further includes a tubular member for introducing a portion of compressed air flow from a blower, and a gap is formed between an opening formed in the exhaust pipe member and an adjacent end of the tubular member. A guide tube member defines the opening in the interior of the upstream end of the exhaust pipe member.

2 Claims, 2 Drawing Sheets

POWER EQUIPMENT

BACKGROUND OF THE INVENTION

1. Field of the Invention

The present invention relates generally to power equipment of the type that has an internal combustion engine incorporated as a power source, a muffler connected with the internal combustion engine for muffling and discharging exhaust gas, and a blower driven by the internal combustion engine. More specifically, the present invention is concerned with power equipment such as portable power blower apparatus of a back-pack type which is commonly operated relatively close to an operator.

2. Description of the Related Art

Such a power equipment as is known in the art is so constructed that exhaust gas from an internal combustion engine is discharged through a silencer, namely, muffler to reduce the noise of an engine exhaust, in order to mitigate the discomfort of an operator and improve working efficiency.

However, such a conventional type of power equipment involves the following problems. Exhaust gas from the muffler is discharged with high temperature, and therefore there is a risk of causing a fire. In addition, the muffler has been a danger to an operator since the muffler itself is heated to high temperature.

SUMMARY OF THE INVENTION

It is, therefore, an object of the present invention to provide a power equipment in which the safety of an operator is improved since the temperature of a muffler itself and the temperature of exhaust gas discharged therefrom can be substantially lowered.

To achieve the above and other objects, in accordance with the present invention, there is provided a power equipment comprising: an internal combustion engine incorporated as a power source; a muffler connected with the internal combustion engine for muffling and discharging exhaust gas from the internal combustion engine; a blower driven by the internal combustion engine; an exhaust pipe member disposed in the vicinity of the muffler, the exhaust pipe member having an exhaust gas passage portion which communicates at one end thereof with the outlet of the muffler and an outlet passage portion which is communicating with the other end of the exhaust gas passage portion at a side portion of an upstream end thereof and having a downstream outlet end which communicates with the atmosphere; a tubular member connected at one end thereof with the blower for introducing a portion of compressed air flow from the blower; a gap defined between an opening formed in the exhaust pipe member at an upstream end thereof and the other end of the tubular member disposed in the vicinity of the opening, and the gap opened to the atmosphere; and a guide pipe member which defines the opening in the interior of the upstream end of the exhaust pipe member.

Therefore, in the power equipment of the present invention, a compressed air flow is partially introduced from the blower into the tubular member, and is introduced as a primary cooling wind into the outlet passage portion from the opening formed at the upstream end of the exhaust pipe member. Simultaneously, the atmospheric air is introduced as a secondary cooling wind through the gap between the other end of the tubular member and the opening formed at the upstream end of the outlet passage portion. Exhaust gases flowing from the muffler through the exhaust gas passage portion into the outlet passage portion of the exhaust pipe member are mixed with the primary and secondary cooling winds. Thus, the temperature of the exhaust gas is sufficiently lowered and discharged through the downstream outlet end of the outlet passage portion. During this time, the primary cooling wind acts to attract air around the muffler and the internal combustion engine as the secondary cooling wind. Accordingly, air smoothly flows along the peripheries of the muffler and the engine to promote the cooling thereof, and it is therefore possible to prevent operators from exposing themselves to hazards due to heat. The flows of the primary and secondary winds act to suck the exhaust gas from the muffler into the outlet passage portion of the exhaust pipe member, so that engine efficiency can be improved.

Further objects, features and advantages of the present invention will become apparent from the following description of preferred embodiments of the present invention, taken with reference to the accompanying drawings.

DESCRIPTION OF THE PREFERRED EMBODIMENTS

Preferred embodiments of the present invention will be described below with reference to the accompanying drawings.

Figure 1:
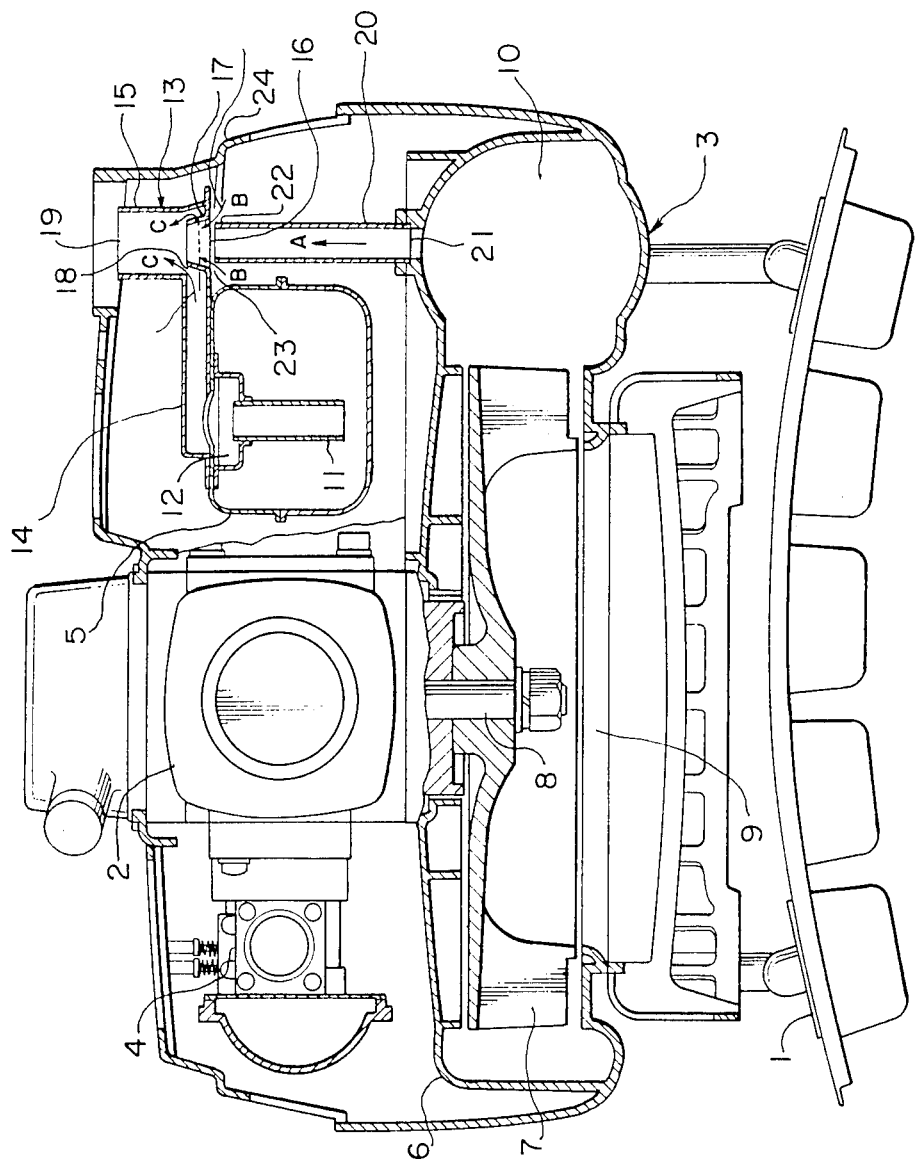
FIG. 1 is a cross sectional view of the essential portion of one preferred embodiment of a power equipment in accordance with the present invention.

Referring first to FIG. 1, there is shown a back-pack type portable power blower as a power equipment to which a first embodiment of the present invention is applied. A frame 1, which is designed to be carried on the back of an operator while in use, is equipped with an internal combustion engine 2 as a power source and a blower 3 which is disposed near the back of the operator in side-by-side relationship with the internal combustion engine 2.

When a mixed gas of a fuel and air is supplied from a carburretor 4 to the internal combustion engine 2, the internal combustion engine 2 is actuated by the combustion of the mixed gas therein. Exhaust gas from the internal combustion engine 2 are passed through a muffler 5, cooled and muffled as will be described later, and discharged from the equipment.

The blower 3 has a volute casing 6 within which an impeller shaft 8 fitted an impeller 7 is rotatably supported. The impeller shaft 8 is integrally connected to a crankshaft of the internal combustion engine 2 so that the impeller shaft 8 can be rotated. A suction inlet 9 through which air is sucked is provided in the center of the blower 3 on the side opposite to the internal combustion engine 2. Air sucked through the suction inlet 9 is compressed by the rotation of the impeller 7 within the volute casing 6, and the thus-compressed air is fed by pressure into a wind passage 10 which is defined in the volute casing 6 around an inner periphery thereof. Although not shown, in the case of chemical spraying, a spray nozzle is provided at the distal end of a spray tube to be operated by an operator and, in the spray nozzle, compressed air in the wind passage 10 is mixed with a chemical liquid supplied from a chemical liquid storage tank. Thus, the chemical liquid is discharged in a spray from the spray nozzle and is springled around. Since the above-described structure of the chemical sprayer is the same as those of conventional chemical sprayers, further detailed description are omitted.

Exhaust gas discharged from the internal combustion engine 2 into the muffler 5 pass through an internal passage 11 of the muffler 5, and reach an outlet 12 of the muffler 5. An exhaust pipe member 13 is attached to the muffler 5 at the exterior thereof. The exhaust pipe member 13 has an exhaust gas passage portion 14 and an outlet passage portion 15 which are integral with each other. The exhaust gas passage portion 14 extends laterally of the muffler 5 at the exterior thereof, and the upstream end of the exhaust gas passage portion 14 communicates with the outlet 12 of the internal passage 11 in the muffler 5 so that exhaust gas may flow into the exhaust gas passage portion 14. The outlet passage portion 15 is bent rearwardly of the equipment substantially at right angles to the axis of the exhaust gas passage portion 14, and a side portion of the outlet passage portion 15 at its upstream end communicates with the downstream end of the exhaust gas passage portion 14. A circular opening 16, which expands outwardly toward an tubular member 20, is formed in the upstream end of the outlet passage portion 15, and a funnel-like guide tube member 17 extends from the upstream end of the outlet passage portion 15 into the interior thereof so as to surround the opening 16. The downstream end of the exhaust gas passage portion 14 communicates with the upstream end of the outlet passage portion 15 through an annular gap 18 which is defined by the guide tube member 17. A downstream outlet end 19 of the outlet passage portion 15 is formed as an opening which faces rearwardly of the frame 1, that is, in the direction opposite to the operator.

The tubular member 20 is fixed to the casing 6 of the blower 3 at an upstream end 21 thereof, and the tubular member 20 communicates with the wind passage 10 of the casing 6. The tubular member 20 is disposed coaxially with the outlet passage portion 15 of the exhaust pipe member 13. A downstream end 22 of the tubular member 20 is positioned in close proximity to the opening 16 of the exhaust pipe member 13, and an annular gap 23 is defined between the downstream end 22 and the guide tube member 17.

In operation, a compressed air flow in the wind passage 10 of the blower 3 is partially introduced into the tubular member 20 as indicated by an arrow A. The thus-introduced air passes from the downstream end 22 of the tubular member 20 through the opening 16 and the guide tube member 17, then flows into the outlet passage portion 15 of the exhaust pipe member 13, and is subsequently discharged from the equipment in the rearward direction thereof through the downstream outlet end 19 of the outlet passage portion 15. In the meantime, exhaust gas discharged from the internal combustion engine 2 into the internal passage 11 of the muffler 5 flow through the outlet 12 into the exhaust gas passage portion 14 of the exhaust pipe member 13. Further, the exhaust gas passes through the annular gap 18 and flows into the outlet passage portion 15 as indicated by arrows C. In the outlet passage portion 15, the exhaust gas is cooled by mixing with an air flow from the guide tube member 17, and the cooled exhaust gas together with the air flow are discharged from the equipment in the rearward direction thereof through the downstream outlet end 19 of the outlet passage portion 15. During this time, the air flow from the guide tube member 17 provides the suction action of promoting the discharge of the exhaust gas from the muffler 5, and therefore acts to improve the engine efficiency of the internal combustion engine 2. An air flow which is fed by pressure from the blower 3 through the tubular member 20 acts as a primary cooling wind. At the same time, this flow of air flows into the opening 16 of the exhaust pipe member 13, air in a cover case 24 of the equipment (a chemical sprayer) is sucked through the annular gap 23 as indicated by arrows B. The thus-produced flow of air flows into the outlet passage portion 15 of the exhaust pipe member 13 as a secondary cooling wind, and further promotes the cooling of the exhaust gas and at the same time accelerates air flow around the internal combustion engine 2 and the muffler 5 to promote the cooling of them.

Figure 2:
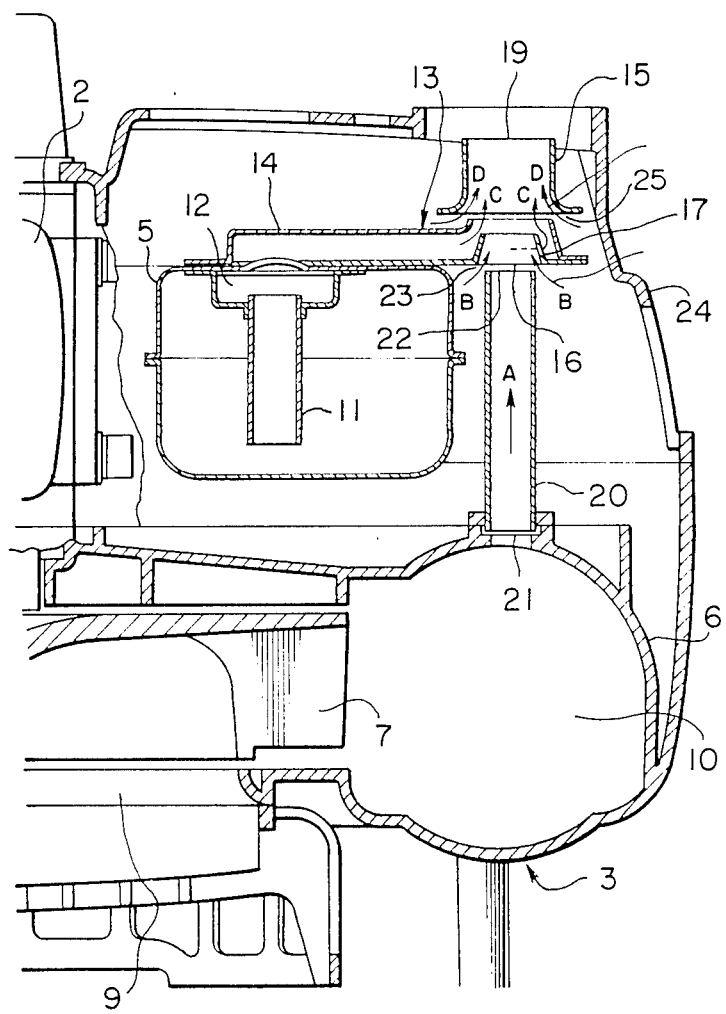
FIG. 2 is a cross sectional view of the essential portion of another preferred embodiment of the present invention.

Referring to FIG. 2 which illustrates another embodiment, a side opening 25 which expands radially outwardly is formed at an intermediate position in the side wall of the outlet passage portion 15 of the exhaust pipe member 13. Air in the cover case 24 is introduced through the side opening 25 into the outlet passage portion 15 as a tertiary cooling wind as indicated by arrows D. Therefore, exhaust gas is further cooled as compared with the previously-described first embodiment. However, since the construction and effect of the remaining portions are the same as those of the embodiment shown in FIG. 1, the description thereof is omitted.

What is claimed is:
1. A power equipment comprising:
an internal combustion engine incorporated as a power source;
a muffler connected with said internal combustion engine for muffling and discharging exhaust gas from said internal combustion engine;
a blower driven by said internal combustion engine;
an exhaust pipe member disposed in the vicinity of said muffler, said exhaust pipe member having an exhaust gas passage portion which communicates at one end thereof with the outlet of said muffler and an outlet passage portion which is communicating with the other end of said exhaust gas passage portion at a side portion of an upstream end thereof and having a downstream outlet end which communicates with the atmosphere;
a tubular member connected at one end thereof with said blower for introducing a portion of compressed air flow from said blower;
a gap defined between an opening formed in said exhaust pipe member at an upstream end thereof and the other end of said tubular member disposed in the vicinity of said opening, and said gap opened to the atmosphere; and
a guide pipe member which defines said opening in the interior of the upstream end of said exhaust pipe member.

2. A power equipment according to claim 1, wherein a side opening which expands radially outwardly is formed at an intermediate position in a side wall of said outlet passage portion of said exhaust pipe member.

* * * * *